3,388,102
HALOGENATED SILANE-STABILIZED COMPOSITIONS CONTAINING UNREACTED ISOCYANATE GROUPS AND THE USE THEREOF IN THE PREPARATION OF POLYURETHANE REACTION PRODUCTS
Bernardas Brizgys, Southgate, Mich., assignor to Wyandotte Chemicals Corporation, Wyandotte, Mich., a corporation of Michigan
No Drawing. Filed Feb. 25, 1966, Ser. No. 529,967
8 Claims. (Cl. 260—77.5)

ABSTRACT OF THE DISCLOSURE

Halogenated silanes have been found to be useful as stabilizing agents for compositions containing unreacted isocyanate groups. The stabilized compositions are particularly useful in the preparation of one- and two-component polyurethane coating compositions.

---

The present invention relates to stabilized compositions containing unreacted isocyanate groups. More particularly, the invention relates to stabilized isocyanate-terminated prepolymers which, when employed in the preparation of one- and two-component polyurethane reaction products, provide for highly-stable, quick-curing products.

Compositions containing unreacted isocyanate groups, particularly prepolymers prepared by the reaction of an organic polyol with an organic polyisocyanate in amounts such that an excess of isocyanate groups are present in the prepolymer, are often employed in the preparation of polyurethane reaction products. One particular disadvantage associated with these prepolymers is that they are highly reactive with or sensitive to water. Another disadvantage is that the unreacted isocyanate groups, being highly reactive, often interact with the urea and/or urethane groups of the prepolymers forming various biuret and allophanate derivatives. These derivatives interfere with the strength, stability and color of polyurethane products prepared from these prepolymers.

One method proposed in the art in an effort to overcome the disadvantages associated with isocyanate-terminated prepolymers relates to the blocking of the isocyanate groups with a compound having an active hydrogen atom. Although this method solves the problem of the reactivity of the isocyanate groups, it creates still another problem, that is, how to unblock the isocyanate groups prior to the use of the prepolymers, particularly in polyurethane coating compositions.

Another method proposed by the art relates to the use of stabilizers for the isocyanate-terminated prepolymers. A number of stabilizers have been proposed. Some of the known stabilizers have effectively controlled the reactivity of the isocyanate groups. However, prepolymers containing these stabilizers have not found utility in the preparation of polyurethane reaction products because these stabilizers, even in minute amounts, have totally prevented or seriously inhibited the cure of products prepared in their presence. Those known stabilizers that do not adversely affect the cure rate have not imparted to the prepolymers a sufficient shelf life or pot life to be commercially acceptable. As a result, these prepolymers must be used shortly after their preparation if they are to be useful in polyurethane preparations. Accordingly, there is a need in the art for isocyanate-terminated prepolymers having enhanced stability which, when employed in one- or two-component polyurethane reaction products, enables the products to be quickly cured without adversely affecting the physical properties of the cured products.

Accordingly, it is an object of the invention to provide for stabilized isocyanate-terminated prepolymers. It is a further object of the invention to provide for stabilized isocyanate-terminaed prepolymers which, employed, in one-component polyurethane reaction products, exhibit improved shelf stability without significantly inhibiting the rate of cure of the products. Another object of the invention is to provide for stabilized isocyanate-terminated prepolymers which, employed as one component, in two-component polyurethane reaction products, exhibit improved pot life without inhibiting the rate of cure of the products. Still another object of the invention is to provide for two-component polyurethane reaction products comprising a hydroxyl-containing component, an isocyanate-containing component and a stabilizer. A further object of the invention is to provide for stabilized polyurethane coating compositions which when cast and cured, yield coatings having surprising physical properties. These and other objects of the invention will become apparent from the specification and examples which follow.

The foregoing objects of the present invention are accomplished by adding a certain group of halogenated silanes to a composition containing unreacted isocyanate groups. The silanes which are employed in accordance with the present invention may be represented by the formula:

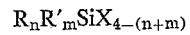

$$R_nR'_mSiX_{4-(n+m)}$$

wherein:
R is a hydrocarbon radical,
R' is hydrogen,
X is a halogen,
m is 0 or 1,
n is from 0 to 3 with the further proviso that
 (a) when m is 1, n is 1 or 2 and
 (b) the sum of n+m is from 0 to 3.

Typical halogenated silanes which may be employed in the preparation of the stabilized compositions of the present invention include dimethyl chlorosilane, methyl dichlorosilane, trimethyl chlorosilane, ethyl trichlorosilane, vinyl trichlorosilane, allyl trichlorosilane, phenyl dichlorosilane, di-t-butyl dichlorosilane, dimethyl fluorosilane, methyl trifluorosilane, ethyl difluorosilane, methyl tribromosilane, methyl triiodosilane, vinyl difluorosilane, trimethyl bromosilane, and tetrachlorosilane. The amount of halogenated silane which may be employed in accordance with the invention may vary considerably. One consideration is the particular silane employed. The higher the halogen content of the silane, the lower the amount of compound required to effect stabilization. Thus, small amounts of a compound such as methyl trifluorosilane will perform quite adequately, whereas larger amounts of a compound such as trimethyl fluorosilane are required. In general, from about 0.001 weight percent to about 0.5 weight percent, preferably 0.002 weight percent to 0.02 weight percent, based on the isocyanate-containing composition of halogenated silane will be employed.

As mentioned, the compositions which are stabilized in accordance with the present invention are generally prepolymers prepared by the reaction of an organic polyol with an organic polyisocyanate. The reactants are employed in amounts such that an excess of isocyanate groups are present in the prepolymer. Stated otherwise, the NCO/OH ratio of the reactants is greater than one. Usually, a prepolymer is prepared having from about 1% to 10% unreacted isocyanate groups and these are the prepolymers, particularly those having from 1% to 5% unreacted isocyanate groups, to which the present invention is particularly directed.

Organic polyisocyanates which may be employed in the preparation of the isocyanate-terminated prepolymers include aromatic, aliphatic and cycloaliphatic polyisocyanates and combinations thereof. Representative of these types are the diisocyanates such as m-phenylene diisocyanate, toluene - 2,4-diisocyanate, hexamethylene-1,6-diisocyanate, tetramethylene - 1,4-diisocyanate, cyclohexane-1,4 - diisocyanate, naphthylene - 1,5 - diisocyanate, 1-methoxyphenyl - 2,4-diisocyanate, diphenylmethane-4,4'-diisocyanate, 4,4' - biphenylene diisocyanate, 3,3'-dimethoxy - 4,4' - biphenyl diisocyanate, 3,3'-dimethyl-4,4' - biphenyl diisocyanate, and 3,3' - dimethyldiphenylmethane - 4,4' - diisocyanate; the triisocyanates such as 4,4',4" - triphenylmethane diisocyanate, polymethylene polyphenylisocyanate and toluene 2,4,6 - triisocyanate and the tetraisocyanates such as 4,4'-dimethyldiphenylmethane 2,2',5,5'-tetraisocyanate. Especially useful due to their availability and properties are toluene diisocyanate, diphenylmethane - 4,4'-diisocyanate and polymethylene polyphenylisocyanate.

Illustrative of the organic polyols which may be employed in the preparation of the isocyanate-terminated prepolymers are those polyols containing at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen or sulphur atoms. Thus, suitable active hydrogen-containing groups as determined by the Zerewitinoff method which are reactive with an isocyanate group include —OH, —NH—, —COOH and —SH. Examples of suitable types of organic compounds containing at least two active hydrogen-containing groups which are reactive with an isocyanate group are hydroxyl-containing polyesters, polyalkylene polyether polyols, hydroxy-terminated polyurethane polymers, polyhydric polythioethers, alkylene oxide adducts of acid and phosphorus, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1 - trimethylolethane, hexane-1,2,6-triol, α-methyl glucoside, pentaerythritol and sorbitol. Also included within the term "polyhydric alcohol" are compounds derived from phenol such as 2,2-(4,4'-hydroxyphenol) propane, commonly known as Bisphenol A.

Any suitable polyalkylene polyether polyols may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and Encyclopedia of Chemical Technology, vol. 7, pp. 257-262, published by Interscience Publishers, Inc. (1951) or in U.S. Patent No. 1,922,459. Polyethers which are preferred include the alkylene oxide addition products of trimethylolpropane, pentaerythritol, propylene glycol and 2,2-(4,4'-hydroxyphenyl)propane.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene and 2,4-secondary diamino toluylene; aliphatic polyamines such as N,N'-secondary ethylene diamine, N,N'-secondary 1,3-propylene diamine, N,N'-secondary 1,4-butylene diamine, and N,N'-secondary 1,3-butylene diamine.

Other compounds which do not necessarily fit within any of the previously set forth classes of compounds which are quite suitable in the production of NCO-terminated polyurethane compounds include the hydroxy-terminated polyurethane polymers such as a hydroxy-terminated polymer made by reacting an isocyanate with several moles of an alkylene glycol.

In a preferred embodiment of the present invention, the compositions which are stabilized with a halogenated silane are employed in the preparation of polyurethane coating compositions. The resulting coating compositions have been found to possess enhanced stability, as demonstrated in the examples which follow. In typical one-component polyurethane coating compositions employing compositions stabilized in accordance with this invention, marked increases in shelf life of the coating compositions are obtained. In addition, the rate of cure of the coating compositions and the physical properties of the resulting coatings are not adversely affected. In typical two-component polyurethane coating compositions employing compositions stabilized in accordance with this invention, marked increases in pot life of the coating compositions are obtained, again without adversely affecting the rate of cure of the coating compositions or the physical properties of resulting coatings.

The preparation of the polyurethane coating compositions which comprises a preferred embodiment of the invention follows standard prior art procedures. Thus, a stabilized isocyanate-terminated prepolymer may be diluted with any suitable non-reactive surface coating solvent. Many such solvents are known in the art, for example, 2-ethoxyethyl acetate, 2-methoxyethyl acetate, 2-butoxyethyl acetate, toluene, xylene, ethyl acetate, butyl acetate, methylisobutyl ketone, other similar ketones, chlorinated solvents, nitroaliphatic solvents, and dioxane.

In the preparation of two-component polyurethane coating compositions in accordance with a preferred embodiment of the invention, a stabilized isocyanate-terminated prepolymer is employed as one component, along with a hydroxyl-terminated component as the second component. Any hydroxyl-bearing organic compound may be employed as the second component, including those hydroxyl-terminated compounds discussed above in connection with the preparation of the isocyanate-terminated prepolymers. Preferred hydroxyl-terminated components are the polyether polyols, particularly the polyalkylene ether polyols. In the preparation of two-component coating compositions, the silanes are generally added to an isocyanate-terminated prepolymer, which is then combined with a hydroxyl-terminated component and a solvent. However, it is possible to add a silane to a hydroxyl-terminated component and then to combine this mixture with an isocyanate-terminated prepolymer. Furthermore, in the embodiment of the present invention which relates to two-component coating compositions, a polymeric isocyanate such as polymethylene polyphenyl isocyanate may be employed as the isocyanate-containing component of the coating composition.

The polyurethane coating compositions of the invention may be applied to various surfaces by any conventional means such as brushing, spraying, dipping, and passing a heated object through the powdered coating compositions for coating with a doctor blade. The compositions have found particular utility as coatings for leather and floors. In addition, various elastomeric coatings may be prepared from the compositions. Curing of the compositions may occur at room temperature, or, if desired, heat may be applied. The amount of time needed to cure the compositions will vary, depending upon the particular composition, the curing agent, if any, and the amount of moisture and heat which is in contact with the composition.

In addition to coatings, the stabilized compositions of the present invention may be employed in the preparation of numerous other polyurethane reaction products including sealants, elastomers and foams. Well known procedures and ingredients may be employed in the preparation of these polyurethane reaction products.

The following examples serve to illustrate the invention. All parts are by weight unless otherwise indicated.

Example I

An isocyanate-terminated prepolymer was prepared by charging a reaction vessel with 3480 parts of tolylene diisocyanate and 1000 parts of xylene. A mixture of 1704 parts of a 426 molecular weight triol prepared from trimethylolpropane and propylene oxide, 3447 parts of a 766 molecular weight polypropylene glycol, 279 parts of ethylene glycol, 1 part of lead octoate and 1970 parts of xylene was then slowly added to the vessel, maintaining the reaction temperature between 120° F.–140° F. After the addition was completed, the reaction was allowed to proceed for about one hour at about 120° F.–140° F. The prepolymer which resulted was cooled to room temperature and 2970 parts of toluene and 45 parts of tolylene diisocyanate were added to the prepolymer. An isocyanate-terminated prepolymer resulted which contained an unreacted isocyanate content of 4.47%.

Four portions, each of 150 parts, of the isocyanate-terminated prepolymer prepared above, were tested as follows. Thirty parts of methylisobutyl ketone was added to each portion. To one portion (A) no stabilizer was added. To portion B was added ethyl trichlorosilane. To portion C was added vinyl trichlorosilane. To portion D was added methyl dichlorosilane. Based on the prepolymer, 0.02% by weight of all three of the above silanes was added to the prepolymer solutions. The stability of the prepolymers was determined by periodically measuring the viscosity of the solution. The results of this determination are presented in Table 1.

TABLE 1

| Time, Months | Viscosity, poise at 76° F. | | | |
|---|---|---|---|---|
| | A | B | C | D |
| 0 | 2.0 | 1.4 | 1.4 | 1.4 |
| 1 | 2.7 | 2.5 | 2.4 | 2.5 |
| 2 | 3.2 | 2.8 | 2.8 | 3.0 |
| 4 | (¹) | 3.9 | 9.4 | 3.8 |

¹ Gelled.

From the table, it is apparent that the unstabilized prepolymer gelled within four months, whereas those prepolymers stabilized in accordance with this invention remained essentially stable even after four months.

Example II

To demonstrate the effectiveness of the stabilized isocyanate-terminated prepolymers of the invention when employed in one-component floor coatings, the prepolymers prepared in the previous example where diluted with 35 parts of toluene and 35 parts of xylene. Coatings were then cast which were cured by moisture from the air. Physical properties of the coatings are presented in Table 2.

TABLE 2

| Physical Properties | A | B | C | D |
|---|---|---|---|---|
| Tensile strength, p.s.i. | 4,589 | 4,182 | 4,273 | 4,900 |
| Yield strength, p.s.i. | 4,695 | 5,818 | 4,364 | 4,760 |
| 100% modulus, p.s.i. | 4,168 | | 3,745 | 4,060 |
| Elongation, percent | 120 | 162 | 131 | 165 |
| Elongation at yield, percent | 5 | 6 | 5 | 5 |
| Split tear, p.i. | 12.8 | 26.4 | 23.8 | 20.7 |
| Sward Hardness: | | | | |
| After 2 days | 26 | 26 | 26 | 26 |
| After 6 days | 28 | 28 | 28 | 28 |
| Final | 32 | 32 | 34 | 34 |

From Table 2, it is apparent that the physical properties of the coatings prepared from the stabilized prepolymers did not suffer as a result of the presence of the stabilizer. More importantly, the rate of cure of the coatings was also not affected, as evidenced by the Sward Hardness values.

Example III

An isocyanate-terminated prepolymer was prepared in the manner set forth in Example I employing the same ingredients in the same amounts, with the exception that 4596 parts of a 766 molecular weight polypropylene glycol and 3830 parts of tolylene diisocyanate were employed. An isocyanate-terminated prepolymer resulted which contained an unreacted isocyanate content of 4.4%.

Five portions, each of 100 parts, of the prepolymer prepared above were tested as follows. One portion (A) was employed as a control. To the other four portions, varying amounts of vinyl trichlorosilane were added. The stability of the prepolymers was determined by periodically measuring their viscosity. The results of this determination are presented in Table 3.

TABLE 3

| | A | B | C | D | E |
|---|---|---|---|---|---|
| Amount of silane, percent by wt., based on prepolymer | | 0.002 | 0.02 | 0.1 | 0.2 |
| Viscosity, poise at 76° F | 1.9 | 1.9 | 1.9 | 1.9 | 1.9 |
| After 1 month | | (¹) | 2.5 | 2.3 | 2.3 |
| After 2 months | | | 2.7 | 2.4 | 2.5 | 2.6 |
| After 6 months | | | 3.9 | 5.9 | 7.2 | 7.2 |

¹ Gelled.

From Table 3 it is apparent that small amounts of vinyl trichlorosilane effectively stabilized the prepolymer, whereas the unstabilized prepolymer gelled within one month. After nine and one-half months, prepolymers B, C, D and E were still stable.

One-component polyurethane floor coatings were prepared from the above prepolymers. As in the previous example, a quick-curing coating composition resulted without any significant adverse changes in the physical properties of the coatings.

Example IV

A polyurethane reaction product useful as a sealant was prepared in the following manner.

A prepolymer was prepared from 348 parts of tolylene diisocyanate and 1975 parts of a polypropylene glycol having a molecular weight of 1975. To 100 parts of this prepolymer were added 36.8 parts of a triol having a molecular weight of about 4000 prepared from trimethylolpropane and propylene oxide. A 100% solids isocyanate-terminated prepolymer was obtained which contained 1.5% unreacted isocyanate groups.

The prepolymer was equally divided into two portions and 0.02% by weight of methyldichlorosilane was added to one portion. Films cast from each portion cured at the same rate. Within three days, both films had a Shore A hardness value of 35. Stability tests were also conducted by viscosity measurement at 160° F. Initially, both portions recorded a value of 650 poises. After seven days, the prepolymer which contained the methyldichlorosilane recorded a value of 740 poises, whereas the prepolymer which did not contain any silane stabilizer had gelled.

Example V

This example demonstrates the effectiveness of isocyanate-terminated prepolymers stabilized in accordance with the invention when employed in the preparation of two-component polyurethane compositions.

An isocyanate-terminated prepolymer was prepared, in the manner set forth in Example I, from 403 parts of a 403 molecular weight condensation product of pentaerythritol and propylene oxide and 714 parts of tolylene diisocyanate. The prepolymer had an unreacted isocyanate content of 10.6%.

Two-component polyurethane compositions were prepared employing the above prepolymer as one component along with a hydroxyl-terminated prepolymer as the other component. Various stabilizers and inert solvents were added to the compositions. A portion of each composition was set aside for stability tests while a coating was cast from the other portion.

The stability of the compositions is presented in Table 4, as are the rates of cure and physical properties of coatings prepared therefrom. The hydroxyl-terminated component which was employed in the preparation of the compositions was prepared by the reaction of 4176 parts of tolylene diisocyanate with a mixture comprising 8608 parts of a 538 molecular weight condensation product of 2,2-(4,4'-hydroxyphenyl)propane and propylene oxide and 7666 parts of a 766 molecular weight polypropylene glycol.

TABLE 4

| | A | B | C | D | E | F | G |
|---|---|---|---|---|---|---|---|
| Components: | | | | | | | |
| Isocyanate-terminated prepolymer, parts | 4.6 | 4.6 | 4.6 | 4.6 | 4.6 | 4.6 | 4.6 |
| Hydroxyl-terminated component ¹, parts | 71 | 71 | 71 | 71 | 71 | 71 | 71 |
| Xylene, parts | 50 | 50 | 50 | 50 | 50 | 50 | 50 |
| Toluene, parts | 50 | 50 | 50 | 50 | 50 | 50 | 50 |
| Benzoyl chloride ² | | 0.1 | | | | | |
| Adypyl chloride ² | | | 0.1 | | | | |
| Acetyl chloride ² | | | | 0.1 | | | |
| Ethyl trichlorosilane ² | | | | | 0.1 | | |
| Vinyl trichlorosilane ² | | | | | | 0.1 | |
| Methyl dichlorosilane ² | | | | | | | 0.1 |
| Viscosity, poise at 76° F | 5.5 | 5.5 | 5.5 | 5.5 | 5.5 | 5.5 | 5.5 |
| In 18 hours | (³) | 12.0 | 10.5 | 7.3 | | | |
| In 10 days | (³) | (³) | (³) | 59.0 | 10.0 | 9.5 | 9.0 |
| Tack-free time at 250° F., min | <3 | <3 | <3 | <3 | <3 | <3 | <3 |
| Physical Properties: | | | | | | | |
| Tensile strength, p.s.i | 4,460 | 3,219 | 2,895 | 3,454 | 3,600 | 2,989 | 3,727 |
| Elongation, percent | 366 | 400 | 430 | 496 | 505 | 485 | 457 |
| Elongation set, percent | 4 | 13 | 15 | 19 | 35 | 19 | 11 |
| Sward Hardness | 12 | 6 | 6 | 6 | 10 | 10 | 10 |
| Split tear, p.i | 143 | 163 | 156 | 162 | 126 | 119 | 142 |

¹ 70% solids content.
² Percent by weight based on solid contents of prepolymer.
³ Gelled.

From Table 4 it is apparent that the composition prepared in accordance with the present invention (Compositions E, F and G) remained essentially stable as evidenced by their viscosity values. The same composition without a stabilizer (Composition A) gelled within 18 hours. Compositions stabilized with known stabilizers (B, C and D) were not nearly as effective as those stabilized in accordance with this invention. Furthermore, the rate of cure of coatings cast from the candidate compositions was not adversely affected by the presence of the stabilizers, or were the physical properties of the coatings.

Example VI

A two-component coating composition useful as a coating for leather was prepared from the following ingredients. The general procedures of Example I was followed.

| | Parts |
|---|---|
| Isocyanate-terminated prepolymer: | |
| Reactive product of 550 parts of tolylene diisocyanate and 426 parts of a 426 molecular weight adduct of propylene oxide and trimethylolpropane (7.1% unreacted isocyanate content) | 7 |
| Methyl dichlorosilane | — |
| Hydroxyl-terminated component: | |
| Reaction product of— | |
| (a) 4304 parts of a 538 molecular weight adduct of propylene oxide and 2,2-(4,4'-hydroxyphenyl)propane, | |
| (b) 3064 parts of a 766 molecular weight polypropylene glycol, and | |
| (c) 1914 parts of tolylene diisocyanate | 100 |
| Xylene | 3100 |
| Toluene | 3090 |
| Methyl ethyl ketone | 3090 |

The same composition was prepared without employing methyl dichlorosilane. The stability of the compositions along with the physical properties of the coatings appear in Table 5.

TABLE 5.—TWO-COMPONENT LEATHER COATING COMPOSITION

| | A | B |
|---|---|---|
| Methyl dichlorosilane, percent by weight based on prepolymer | | 0.01 |
| Viscosity, poise at 76° F. | 4.4 | 4.4 |
| After 2 days | 32.2 | 4.7 |
| After 12 days | (¹) | 9.0 |
| After 23 days | | 17.0 |
| Tack-free time at 250° F., min | <3 | <3 |
| Physical Properties: | | |
| Tensile strength, p.s.i | 1,977 | 1,414 |
| 100% Modulus, p.s.i | 433 | 300 |
| Elongation, percent | 426 | 514 |
| Elongation set, percent | 8 | 14 |
| Sward Hardness | 10 | 10 |
| Split tear, p.i | 115 | 91 |

¹ Gelled.

From Table 5, it is apparent that the composition containing methyl dichlorosilane was highly stable. The pot life of the other composition was less than twelve days, whereas the pot life of the composition containing the silane was greater than 23 days. As demonstrated before, the stability was achieved without sacrificing the cure rate or physical properties of the coatings.

Example VII

A two-component coating composition useful as an elastomeric coating for numerous surfaces was prepared from the following ingredients. The general procedure of Example I was followed.

Isocyanate-terminated prepolymer: Parts
   Reaction product of—
     (a) 403 parts of a 403 molecular weight adduct of propylene oxide and pentaerythritol,
     (b) 1254 parts of a 418 molecular weight polypropylene glycol,
     (c) 2298 parts of a 766 molecular weight polypropylene glycol,
     (d) 2421 parts of a 538 molecular weight adduct of propylene oxide and 2,2-(4,4'-hydroxyphenyl)propane, and
     (e) 2758 parts of tolylene diisocyanate (Unreacted NCO content 2.8%) ------ 100
Methyl dichlorosilane ------------------- —
Hydroxyl-terminated component:
   Dipropylene glycol ----------------- 2.7
   Butyl acetate ---------------------- 290
   Xylene --------------------------- 290
   Toluene -------------------------- 290

The same composition was prepared without employing methyl dichlorosilane. The stability of the compositions along with the physical properties of the coatings appear in Table 6.

TABLE 6

| | A | B |
|---|---|---|
| Methyl dichlorosilane, percent by weight based on prepolymer | | 0.05 |
| Pot life, hours | <16 | 96 |
| Tack-free time at 250° F., min | <3 | <3 |
| Physical Properties: | | |
| Tensile strength, p.s.i | 3,302 | 4,527 |
| Yield strength, p.s.i | 1,430 | 2,281 |
| 100% Modulus, p.s.i | 1,362 | 2,383 |
| Elongation, percent | 316 | 218 |
| Elongation set, percent | 14 | 29 |
| Sward Hardness | 14 | 20 |

From Table 6 it is apparent that the composition containing methyl dichlorosilane was highly stable. The pot life of the other composition was less than sixteen hours, whereas the pot life of the composition containing the silane was greater than 96 hours. As demonstrated before, the stability was achieved without sacrificing the cure rate or physical properties of the coatings.

Example VIII

A two-component polyurethane coating composition was prepared in the following manner.

Seventy-one parts of a hydroxyl-terminated component (70% solids) prepared by the reaction of 412.8 parts of a 538 molecular weight adduct of propylene oxide and 2,2-(4,4'-hydroxyphenyl)propane, 383.7 parts of a 766 molecular weight polypropylene glycol and 208.8 parts of tolylene diisocyanate was diluted in 95.8 parts of toluene and 335.0 parts of methylisobutylketone. A stabilizing amount (0.5 part) of vinyl trichlorosilane was added thereto, along with 1.6 part of polymethylene polyphenylisocyanate. The pot life of the composition was determined to be 290 hours. The pot life of the same composition without the silane stabilizer was thirteen hours. When the compositions were cured, the presence of the stabilizer had no adverse effect on either the rate of cure or the physical properties of the resulting coating.

What is claimed is:

1. A stabilized composition containing unreacted isocyanate groups comprising an isocyanate-terminated prepolymer prepared by the reaction of an organic polyisocyanate with an organic polyol and a stabilizing amount of a halogenated silane represented by the formula:

$$R_nR'_mSiX_{4-(n+m)}$$

wherein:
R is a hydrocarbon radical,
R' is hydrogen,
X is a halogen,
m is 0 or 1,
n is from 0 to 3 with the further proviso that
   (a) when m is 1, n is 1 or 2 and
   (b) the sum of n+m is from 0 to 3.

2. The compositions of claim 1 when X is chlorine.

3. The compositions of claim 1 when the organic polyol is a polyalkylene polyether polyol.

4. The compositions of claim 1 when the amount of silane employed is from 0.001 to 0.5 percent by weight, based on the prepolymer.

5. The compositions of claim 1 when the halogenated silane is ethyl trichlorosilane, vinyl trichlorosilane or methyl dichlorosilane.

6. A one-component polyurethane reaction product comprising a composition of claim 1 in an inert solvent.

7. A two-component polyurethane reaction product comprising a composition of claim 1 and a hydroxyl-terminated component in an inert solvent.

8. A two-component polyurethane reaction product comprising an isocyanate-containing component, a hydroxyl-terminated component, an inert solvent and a halogenated silane represented by the formula:

$$R_nR'_mSiX_{4-(n+m)}$$

wherein:
R is a hydrocarbon radical,
R' is hydrogen,
X is a halogen,
m is 0 or 1,
n is from 0 to 3 with the further proviso that
   (a) when m is 1, n is 1 or 2 and
   (b) the sum of n+m is from 0 to 3.

References Cited

UNITED STATES PATENTS

| 2,753,276 | 7/1956 | Brochhagen et al. | 260—77.5 |
| 2,910,495 | 10/1959 | George | 260—45.7 |
| 3,050,477 | 8/1962 | Gmitter et al. | 260—45.7 |
| 3,137,720 | 6/1964 | Cooper | 260—45.7 |

DONALD E. CZAJA, *Primary Examiner.*

M. J. WELSH, *Assistant Examiner.*